(12) United States Patent
Bontempi et al.

(10) Patent No.: US 8,861,902 B2
(45) Date of Patent: Oct. 14, 2014

(54) PLANAR WAVEGUIDE CIRCUIT AND OPTICAL RECEIVER

(75) Inventors: Francesca Bontempi, Pisa (IT); Luca Poti, Pisa (IT); Antonella Bogoni, Mantova (IT)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 612 days.

(21) Appl. No.: 13/022,200

(22) Filed: Feb. 7, 2011

(65) Prior Publication Data

US 2011/0229069 A1  Sep. 22, 2011

(30) Foreign Application Priority Data

Mar. 16, 2010 (EP) .................... 10156631

(51) Int. Cl.
*G02B 6/12* (2006.01)
*G02B 6/42* (2006.01)
(Continued)

(52) U.S. Cl.
CPC .... *G02B 6/12004* (2013.01); *G02B 2006/1215* (2013.01); *G02B 6/43* (2013.01); *G02B 6/122* (2013.01); *H04B 10/60* (2013.01); *G02B 2006/12147* (2013.01); *G02B 6/125* (2013.01); *G02F 1/035* (2013.01); *G02B 2006/12159* (2013.01)
USPC ............ 385/14; 385/40; 385/45; 385/129; 385/27; 398/43

(58) Field of Classification Search
CPC ...... G02B 6/43; G02B 6/122; G02B 6/12004; G02B 6/125; G02B 2006/12147; G02B 2006/1215; G02B 2006/12159; G02F 1/035; H04B 10/60

USPC .............. 385/1–3, 27, 14, 31, 39, 40, 42, 45, 385/88–92, 129; 398/43, 65, 152, 187, 398/204–205, 245, 214
See application file for complete search history.

(56) References Cited

U.S. PATENT DOCUMENTS 4,887,314 A * 12/1989 Carroll et al. .............. 398/204
6,400,490 B1 * 6/2002 Hosoi ......................... 359/254
(Continued)

FOREIGN PATENT DOCUMENTS

| EP | 0 265 278 A2 | 4/1988 |
|---|---|---|
| EP | 1 462 830 A1 | 9/2004 |
| EP | 1866688 B1 | 3/2009 |
| WO | 2005/086390 A1 | 9/2005 |

OTHER PUBLICATIONS

Extended European Search Report, dated Aug. 5, 2010, in connection with European Patent Application No. 10156631.1.

(Continued)

*Primary Examiner* — Uyen Chau N Le
*Assistant Examiner* — Michael Mooney
(74) *Attorney, Agent, or Firm* — Leffler Intellectual Property Law, PLLC

(57) ABSTRACT

A planar waveguide circuit comprises a first optical splitter to receive an input optical signal, a second optical splitter to receive a reference optical signal, a first optical signal combiner, and a second optical signal combiner. First and second optical waveguides are provided to couple first and second outputs of the first optical splitter to respective inputs of the first and second optical signal combiners. Third and fourth optical waveguides are provided to couple first and second outputs of the second optical splitter to respective inputs of the first and second optical signal combiners. A phase-shifter is provided located to affect the phase of an optical signal propagating in one of the third and fourth optical waveguides. The first and second optical splitters and the first and second optical signal combiners are arranged such that the first, second, third and fourth optical waveguides do not intersect one another.

13 Claims, 4 Drawing Sheets

(51) Int. Cl.
*G02B 6/10* (2006.01)
*H04J 14/00* (2006.01)
*G02B 6/43* (2006.01)
*G02B 6/122* (2006.01)
*H04B 10/60* (2013.01)
*G02B 6/125* (2006.01)
*G02F 1/035* (2006.01)

(56) References Cited

U.S. PATENT DOCUMENTS

| 7,212,708 B2* | 5/2007 | Cheng et al. ............... 385/37 |
| 2002/0025103 A1* | 2/2002 | Thaniyavarn ............... 385/15 |
| 2005/0074198 A1 | 4/2005 | Gao et al. |
| 2007/0111111 A1* | 5/2007 | Tanimura ............... 430/5 |

OTHER PUBLICATIONS

Hoffmann, D. et al. "Integrated optical 90 degrees hybrid on LiNbO3 for phase diversity receivers" Jan. 1, 1988, pp. 33-36, XP006518328.

Soldano, L.B. et al. "New All-Passive 4×4 Planar Optical Phase Diversity Network" Proceedings ECOC/IOOC, Paris, 1991, pp. 96-99.

Seimetz, M. et al. "Options, Feasibility, and Availability of 2×4 90 degree Hybrids for Coherent Optical Systems" Journal of Lightwave Technology, vol. 24, No. 3, Mar. 2006, pp. 1317-1322.

Article 94(3) EPC, dated Nov. 6, 2012, in connection with counterpart European Patent Application No. 10 156 631.3-2217.

EP Summons to Oral Proceedings pursuant to Rule 115(1) EPC, dated Jun. 18, 2014, in connection with European Patent Application No. 10156631.3-1562/2357034, all pages.

* cited by examiner

PLANAR WAVEGUIDE CIRCUIT AND OPTICAL RECEIVER

CROSS-REFERENCE TO RELATED APPLICATIONS

This application claims priority under 35 U.S.C. §119 to European Patent Application No. 10156631.1, filed Mar. 16, 2010, which is hereby incorporated herein by reference in its entirety.

TECHNICAL FIELD

The invention relates to a planar waveguide circuit and to an optical receiver incorporating the planar waveguide circuit.

BACKGROUND 90 degree optical hybrids are widely used within coherent optical receivers to mix four in-phase and quadrature states (B; −B; jB; −jB) of a reference optical signal (B) with a signal to be detected (A). 90 degree optical hybrids are six-port optical devices which generally comprise a pair of linear dividers and a pair of optical signal combiners interconnected by four waveguides, one of which includes a 90 degree phase shifter. In a coherent optical receiver the four vectorial additions of the reference signal and the signal to be detected are detected at two pairs of balanced photodetectors. Various designs for a 90 degree optical hybrid are proposed in Seimetz et al, "Options, feasibility and availability of 2×4 90° hybrids for coherent optical systems", Journal of Lightwave Technology, volume 24, number 3, pp. 1317-1322, March 2006. The prior art designs of 90 degree optical hybrids suffer the problem of cross-talk between waveguides, which can strongly degrade the performance of a coherent optical receiver. Prior art 90 degree optical hybrids can also suffer the problem of an additional phase-shift being introduced due to external factors to one or more signals during propagation through the respective waveguides. This can lead to an imprecise phase shift within the 90 degree optical hybrid, and thus an imprecise phase difference between optical signals to be mixed, resulting in degrading of the in-phase and quadrature signals and a lack of symmetry between the two balanced detection processes of a coherent optical receiver.

SUMMARY

It is an object to provide an improved planar waveguide circuit. It is a further object to provide an improved optical receiver.

A first aspect of the invention provides a planar waveguide circuit comprising first and second optical splitters, first and second optical signal combiners, first, second, third and fourth optical waveguides and a phase-shifter. The first optical splitter is arranged to receive an input optical signal and the second optical splitter is arranged to receive a reference optical signal. The first and second optical waveguides are arranged to couple a first output and a second output of the first optical splitter to respective inputs of the first and second optical signal combiners. The third and fourth optical waveguides are arranged to couple a first output and a second output of the second optical splitter to respective inputs of the first and second optical signal combiners. The phase-shifter is located to affect the phase of an optical signal propagating in one of the third and fourth optical waveguides. The first and second optical splitters and the first and second optical signal combiners are arranged such that the first, second, third and fourth optical waveguides do not intersect one another.

A planar waveguide circuit is thus provided in which cross-talk between waveguides may be mitigated or prevented. The planar waveguide circuit may be used to provide a 90 degree optical hybrid in which cross-talk between waveguides may be mitigated or avoided.

In an embodiment, the waveguides are arranged in spaced relationships with one another such that they do not intersect one another.

In an embodiment, the first optical waveguide is arranged to couple the first output of the first optical splitter to a first input of the first optical signal combiner, the second optical waveguide is arranged to couple the second output of the first optical splitter to a first input of the second optical signal combiner, the third optical waveguide is arranged to couple the first output of the second optical splitter to a second input of the second optical signal combiner, and the fourth optical waveguide is arranged to couple the second output of the second optical splitter to a second input of the second optical signal combiner.

In an embodiment, the first and second optical waveguides have equivalent path lengths and the third and fourth optical waveguides have equivalent path lengths. The introduction due to external factors of an additional phase-shift between optical signals propagating in the first and second optical waveguides and between optical signals propagating in the third and fourth optical waveguides may therefore be mitigated. Degrading of in-phase and quadrature reference signals may therefore be minimised.

In an embodiment, all the optical waveguides have substantially equivalent path lengths. The introduction due to external factors of an additional phase-shift between any pair of optical signals propagating in the optical waveguides may therefore be prevented.

In an embodiment, the first and second optical waveguides have substantially mirror symmetric paths and the third and fourth optical waveguides have substantially mirror symmetric paths. Optical signals propagating in the first and second optical waveguides may therefore have the same optical path length as one another and optical signals propagating in the third and fourth optical waveguides may similarly have the same optical path length as one another. Changes to the optical path length due to external, environmental factors, such as temperature, may thus affect both the first and second optical waveguides equally and both the third and fourth waveguides equally. The introduction of an additional phase-shift between optical signals propagating in the first and second optical waveguides and between optical signals propagating in the third and fourth optical waveguides may therefore be avoided. Degrading of in-phase and quadrature reference signals may therefore be minimised.

In an embodiment, the first and an adjacent one of the third and fourth optical waveguides have substantially mirror symmetric paths and the second and an adjacent one of the third and fourth optical waveguides have substantially mirror symmetric paths. The waveguides may therefore be arranged with mirror symmetry in two axes of symmetry. Optical signals which are to be mixed together may therefore experience the same optical path length as each other and changes to the optical path length due to external, environmental factors may equally affect optical signals to be mixed together. The introduction of additional phase-shift between optical signals which are to be mixed together may therefore be avoided.

In an embodiment, the first and second optical splitters are provided at generally opposing locations within the planar waveguide circuit. This geometry may facilitate the waveguides being arranged such that they do not intersect one another.

In an embodiment, the first optical signal combiner is provided on one side of the second optical splitter and the second optical signal combiner is provided on the other side of the second optical splitter. This geometry may enable the first and second optical waveguides to have substantially mirror symmetric paths and the third and fourth optical waveguides to have substantially mirror symmetric paths.

In an embodiment, the planar waveguide circuit is provided on one of a square substrate and a rectangular substrate and the first and second optical splitters are provided towards opposing edges of the substrate and the first and second optical signal combiners are provided towards the same edge of the substrate as the second optical splitter.

In an embodiment, the first optical signal combiner is provided at a first location within the planar waveguide circuit and the second optical signal combiner is provided at a second location within the planar waveguide circuit, substantially opposite the first location, the first and second locations being spaced from the first and second optical splitters. This geometry may enable the first and an adjacent one of the third and fourth optical waveguides have substantially mirror symmetric paths and the second and an adjacent one of the third and fourth optical waveguides have substantially mirror symmetric paths.

In an embodiment, the planar waveguide circuit is provided on one of a square substrate and a rectangular substrate and the first and second optical splitters are provided towards first and second opposing edges of the substrate and the first and second optical signal combiners are provided towards third and fourth opposing edges of the substrate.

In an embodiment, the first and second optical splitters comprise one of a three-port optical waveguide splitter and a four-port optical waveguide coupler.

In an embodiment, the first and second optical signal combiners comprise four-port 3 dB optical couplers.

In an embodiment, the phase-shifter is provided within waveguide. In an alternative embodiment, the phase-shifter is arranged to affect a portion of the waveguide such that the phase of an optical signal propagating through the said portion is changed. In an embodiment, the phase-shifter comprises a resistive heater arranged to affect the portion of the waveguide to change the refractive index of the portion of the waveguide. The use of a resistive heater to effect a phase shift may preserve the equal path lengths of the optical waveguides.

In an embodiment, the phase-shifter comprises a ninety-degree phase shifter.

In an embodiment, the outputs of the first and second signal combiners form outputs of the planar waveguide circuit.

In an embodiment, the planar waveguide circuit comprises a ninety-degree optical hybrid.

A second aspect of the invention provides an optical receiver comprising:
 a first optical input arranged to receive an optical signal;
 a second optical input arranged to receive a reference optical signal;
 a planar waveguide circuit as described above; and
 first, second, third and fourth photodetectors coupled to respective outputs of the first and second optical signal combiners.

In an embodiment, the optical receiver further comprises an optical source arranged to generate the reference optical signal. The optical source is coupled to the second optical input.

In an embodiment, the optical receiver further comprises turning mirrors arranged to couple the outputs of the first and second optical signal combiners to the respective photodetectors.

DETAILED DESCRIPTION

Figure 1:
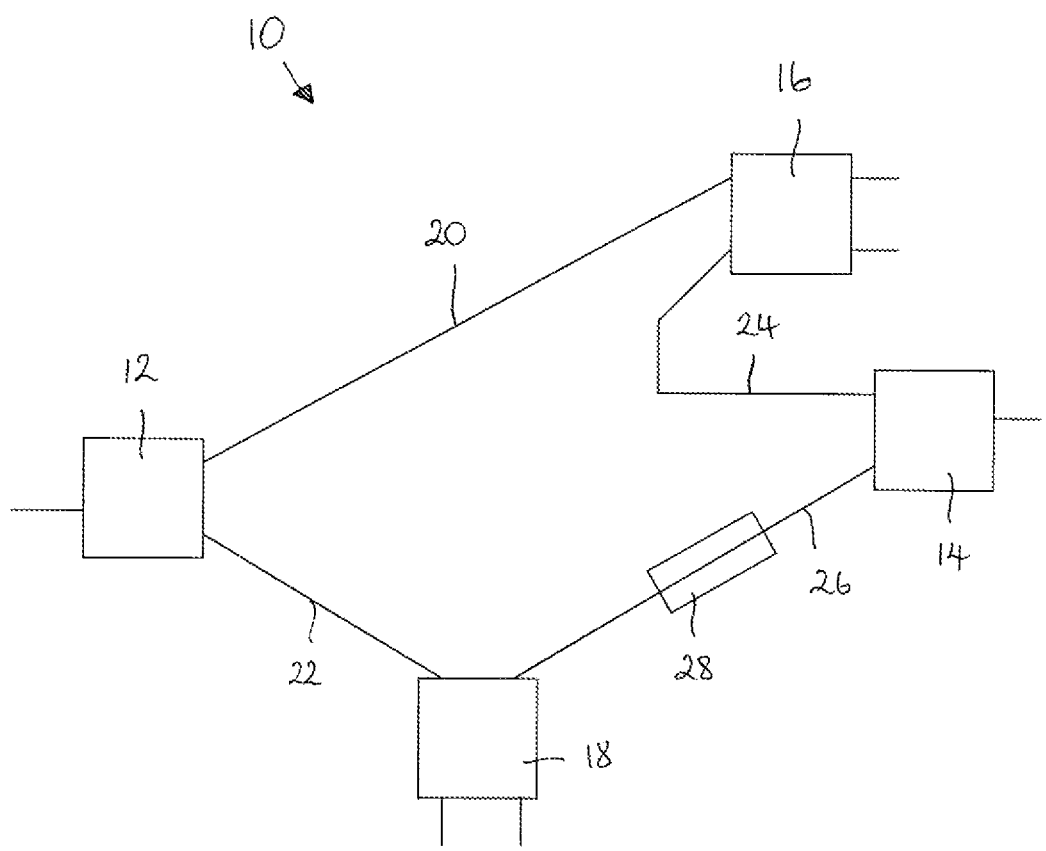
FIG. 1 is a schematic representation of a planar waveguide circuit according to a first embodiment of the invention.

A first embodiment of the invention provides a planar waveguide circuit 10 as shown in FIG. 1. The planar waveguide circuit 10 comprises a first optical splitter 12, a second optical splitter 14, a first optical signal combiner 16, a second optical signal combiner 18, four optical waveguides 20, 22, 24, 26 and a phase-shifter 28.

The first optical splitter 12 is arranged to receive an input optical signal. The second optical splitter 14 is arranged to receive a reference optical signal. Each optical splitter 12, 14 is arranged to split the optical power of a received optical signal into an in-phase component and a quadrature-phase component, respectively provided at the outputs of the optical splitters 12, 14. The construction and operation of optical splitters will be well known to the person skilled in the art.

The first and second optical waveguides 20, 22 are arranged to couple first and second outputs of the first optical splitter 12 to respective inputs of the first and second optical signal combiners 16, 18. The third and fourth optical waveguides 24, 26 are arranged to couple first and second outputs of the second optical splitter 14 to respective inputs of the first and second optical signal combiners 16, 18.

As shown in FIG. 1, the first optical waveguide 20 is arranged to couple a first output of the first optical splitter 12 to a first input of the first optical signal combiner 16. The second optical waveguide 22 is arranged to couple the second output of the first optical splitter 12 to a first input of the second optical signal combiner 18. The third optical waveguide 24 is arranged to couple the first output of the second optical splitter 14 to a second input of the first optical signal combiner 16. The fourth optical waveguide 26 is arranged to couple the second output of the second optical splitter 14 to the second input of the second optical signal combiner 18.

The phase-shifter 28 is located to affect the phase of an optical signal propagating in one of the third and fourth optical waveguides, in this example the fourth optical waveguide 26. It will be appreciated that the phase-shifter 28 may equally be provided on the third optical waveguide 24.

The first and second optical splitters 12, 14 and the first and second optical signal combiners 16, 18 are arranged such that the optical waveguides 20, 22, 24, 26 do not intersect one another. The planar waveguide circuit 10 is thus arranged so that cross-talk between waveguides may be mitigated or prevented.

In operation, an input optical signal is received at the first optical splitter 12 and is split in power to form an in-phase signal component and a quadrature-phase signal component. The in-phase signal is routed from the first output of the first optical splitter 12 to, in this example, the first optical signal combiner 16 and the quadrature-phase signal is routed, in this example, from the second output to the second optical signal combiner 18. A reference optical signal received at the second optical splitter 14 is similarly split into an in-phase reference signal component and a quadrature-phase reference signal component. In this example, the in-phase reference signal is routed to the second input of the first optical signal combiner 16 and the quadrature-phase reference signal is routed to the second input of the second optical signal combiner 18. The quadrature-phase reference optical signal propagates along the fourth optical waveguide 26 and experiences a phase shift caused by the phase-shifter 28. The first and second optical signal combiners 16, 18 mix the received input in-phase and quadrature-phase signals with the in-phase and quadrature-phase reference signals. The mixed optical signals are provided at respective outputs of the first and second optical signal combiners 16, 18.

Figure 2:
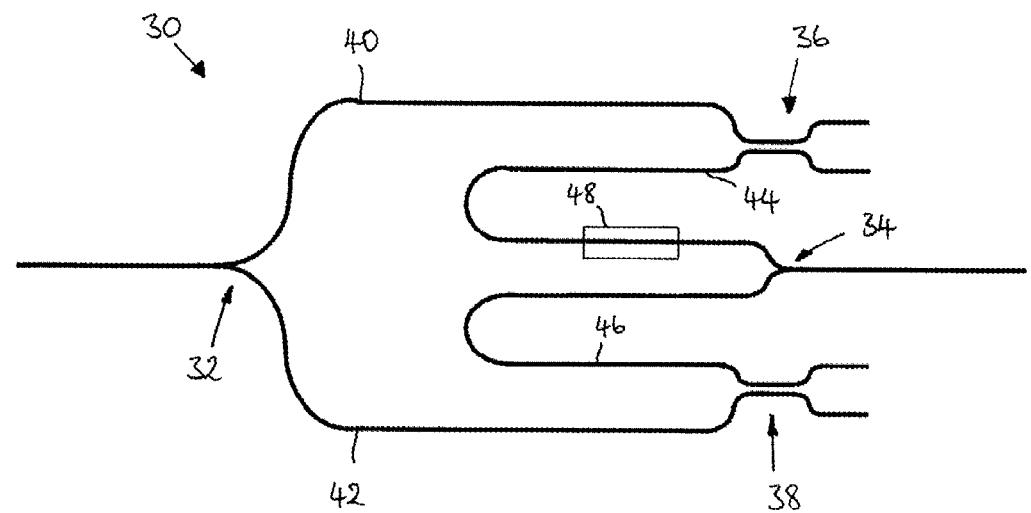
FIG. 2 is a schematic representation of a planar waveguide circuit according to a second embodiment of the invention.

A planar waveguide circuit 30 according to a second embodiment of the invention is shown in FIG. 2. The planar waveguide circuit 30 comprises first and second optical splitters 32, 34, first and second optical signal combiners 36, 38, waveguides 40, 42, 44, 46 and a phase-shifter 48.

Each optical splitter 32, 34 comprises a 3-port optical splitter arranged to receive an optical signal at an input port and to equally split the power of the optical signal into an in-phase signal component provided on one output port of the splitter and a quadrature-phase signal component provided at the other output port of the splitter. In this example, the first and second optical signal combiners 36, 38 comprise 4-port 3 dB couplers each arranged to receive an optical signal on one input port and to output an in-phase component of the signal on one output port and a quadrature-phase component of the signal on the other output port. The design and operation of 3-port optical splitters and 4-port 3 dB couplers will be well known to the person skilled in the art.

A first optical waveguide 40 is arranged to couple a first output of the first optical splitter 32 to a first input of the first optical coupler 36. A second optical waveguide 42 is arranged to couple the second output of the first optical splitter 32 to a first input of the second optical coupler 38. A third optical waveguide 44 is arranged to couple a first output of the second optical splitter 34 to the second input of the first optical coupler 36. A fourth optical waveguide 46 is arranged to couple the second output of the second optical splitter 34 to the second input of the second optical coupler 38.

In this example, the first optical waveguide 40 and the second optical waveguide 42 have substantially equivalent path lengths, and the third optical waveguide 44 and the fourth optical waveguide 46 have substantially equivalent path lengths. The first and second optical waveguides 40, 42 have substantially mirror-symmetric paths from the first optical splitter 32 to the respective optical coupler 36, 38. Similarly, the third and fourth optical waveguides 44, 46 have substantially mirror-symmetric paths from the second optical splitter 34 to a respective one of the first and second optical couplers 36, 38.

The first and second optical couplers 36, 38 are provided on either side of the second optical splitter 34 to thereby ensure that none of the waveguides 40, 42, 44, 46 intersect one another on their paths from the respective optical splitter 32, 34 to the respective optical coupler 36, 38.

The use of pairs of waveguides having equivalent path lengths and mirror-symmetric configurations may allow the introduction of any additional phase-shift between optical signals propagating in each waveguide of a pair to be avoided.

In this example, the phase-shifter 48 is provided on the third optical waveguide 44.

Figure 3:
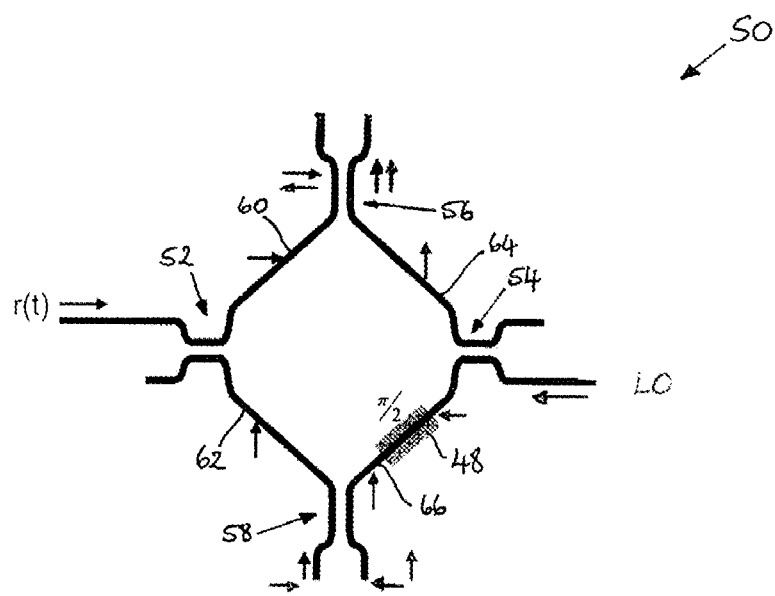
FIG. 3 is a schematic representation of a planar waveguide circuit according to a third embodiment of the invention.

A planar waveguide circuit 50 according to a third embodiment of the invention is shown in FIG. 3.

The planar waveguide circuit 50 comprises first and second optical splitters 52, 54, first and second optical signal combiners 56, 58, optical waveguides 60, 62, 64, 66 and a phase-shifter 48.

The first and second optical splitters 52, 54 in this example comprise 4-port 3 dB optical couplers. The first and second optical signal combiners 56, 58 also each comprise a 4-port 3 dB optical coupler. The phase-shifter 48 comprises a π/2 phase-shifter.

Each of the first and second optical splitters 52, 54 are arranged to receive an optical signal on one input port and to split the optical power of the received optical signal into two substantially equal power output signals, being an in-phase component and a quadrature-phase component provided on the two output ports of the respective coupler 52, 54. The relative phases of the input signal and the output signal components at the output ports of the couplers 52, 54 are indicated by the arrows in FIG. 3.

In this example, the first and optical splitters 52, 54 are provided at generally opposing locations within the planar waveguide circuit 50 and the first and second optical signal combiners 56, 58 are provided at different opposite locations within the planar waveguide circuit 50. The locations of the first and second optical signal combiners 56, 58 are spaced from the first and second optical splitters 52, 54. In this example, the first and second optical splitters 52, 54 are provided generally at opposing sides of a square and the first and second optical splitters 56, 58 are provided generally at the two other opposing sides of the square.

This arrangement of the optical splitters 52, 54 and the optical signal combiners 56, 58 enables the optical waveguides 60, 62, 64, 66 to be arranged such that each waveguide has a substantially equivalent path length and there is two-fold mirror-symmetry in the configuration of the waveguides. That is to say, the first and second optical waveguides 60, 62 have substantially mirror-symmetric paths and the third and fourth optical waveguides 64, 66 have substantially mirror-symmetric paths. In addition, the first and fourth optical waveguides 60, 64 have substantially mirror-symmetric paths and the second and third optical waveguides 62, 66 have substantially mirror-symmetric paths. This arrangement ensures that the four waveguides 60, 62, 64, 66 do not intercept one another and the introduction of any additional phase-shift between optical signals which are to be mixed together in respective optical signal combiners 56, 58 may be avoided.

In this example, the phase-shifter 48 comprises a resistive heater arranged to heat a portion of the waveguide, to thereby change the refractive index of the waveguide in the said portion such that the phase of an optical signal propagating though the said portion of the waveguide is affected and a phase-shift is thereby applied to it.

Figure 4:
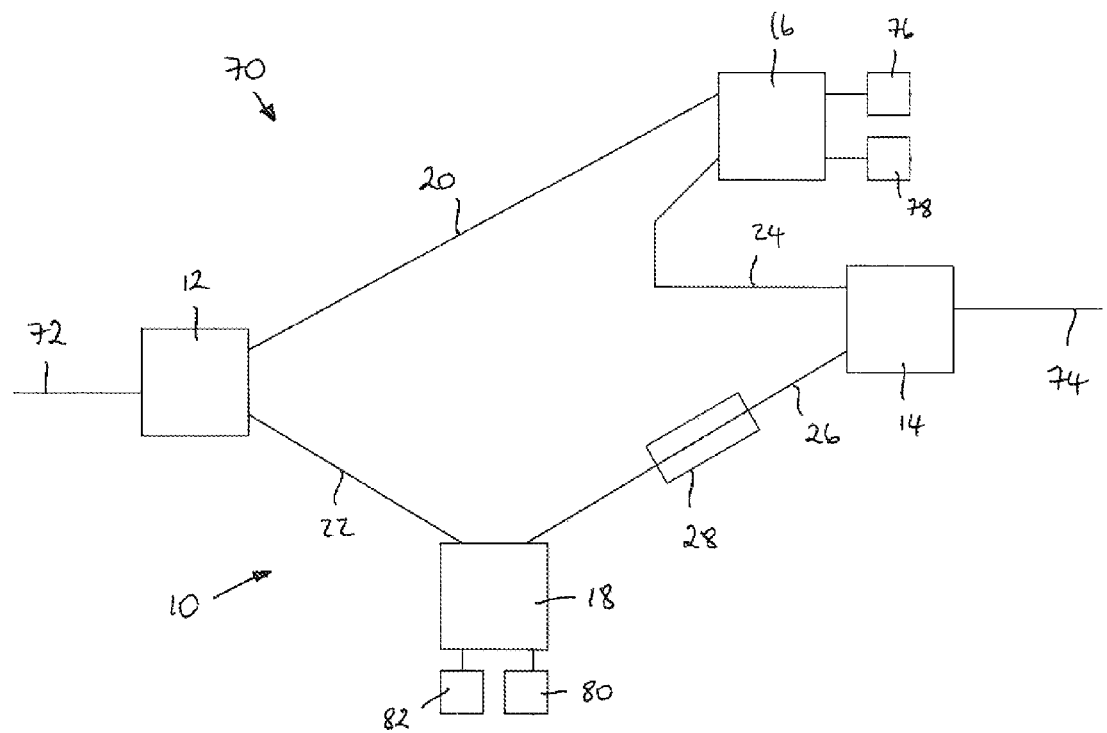
FIG. 4 is a schematic representation of an optical receiver according to a fourth embodiment of the invention.

FIG. 4 shows an optical receiver 70 according to a fourth embodiment of the invention. The optical receiver 70 comprises a first optical input 72, a second optical input 74, a planar waveguide circuit 10 as shown in FIG. 1, and four photodetectors 76, 78, 80, 82.

The first optical input 72 is arranged to receive an optical signal to be detected and the second optical input 74 is arranged to receive a reference optical signal.

The photodetectors 76, 78, 80, 82 are coupled to respective outputs of the first and second optical signal combiners 16, 18 of the planar waveguide circuit 10.

The optical receiver 70 may therefore be used to perform coherent optical detection on an optical signal received at the first optical input 72.

Figure 5:
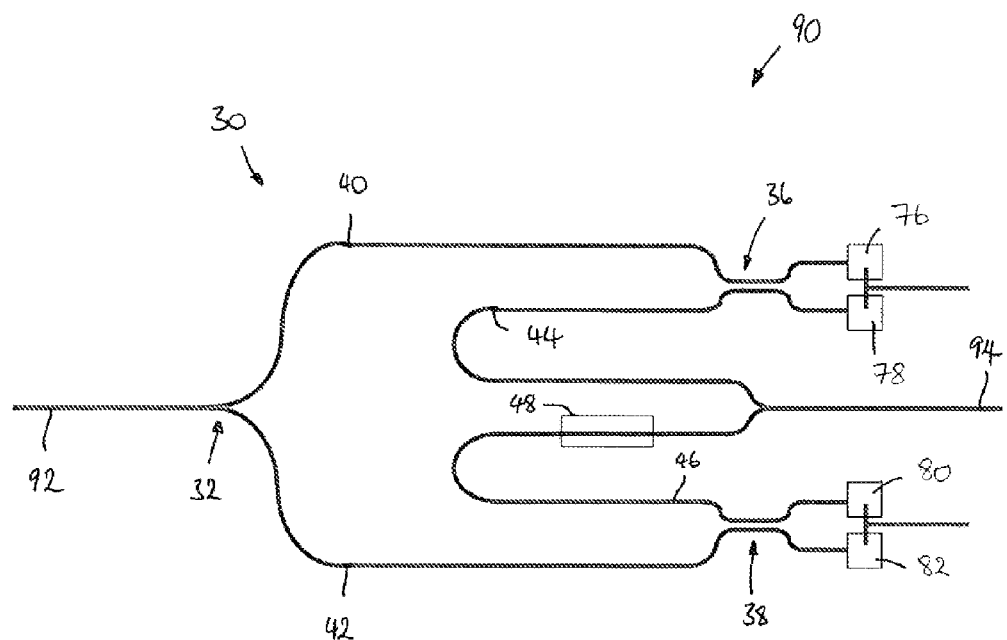
FIG. 5 is a schematic representation of an optical receiver according to a fifth embodiment of the invention.

An optical receiver 90 according to a fifth embodiment of the invention is shown in FIG. 5. The optical receiver 90 comprises a first optical input 92, a second optical input 94, a planar waveguide circuit 30 as shown in FIG. 2 and photodetectors 76, 78, 80, 82.

The first optical input 92 is arranged to receive an optical signal to be detected and the second optical input 94 is arranged to receive a reference optical signal. The photodetectors 76, 78, 80, 82 are coupled to respective outputs of the first and second optical signal combiners 36, 38 of the planar waveguide circuit 30.

Figure 6:
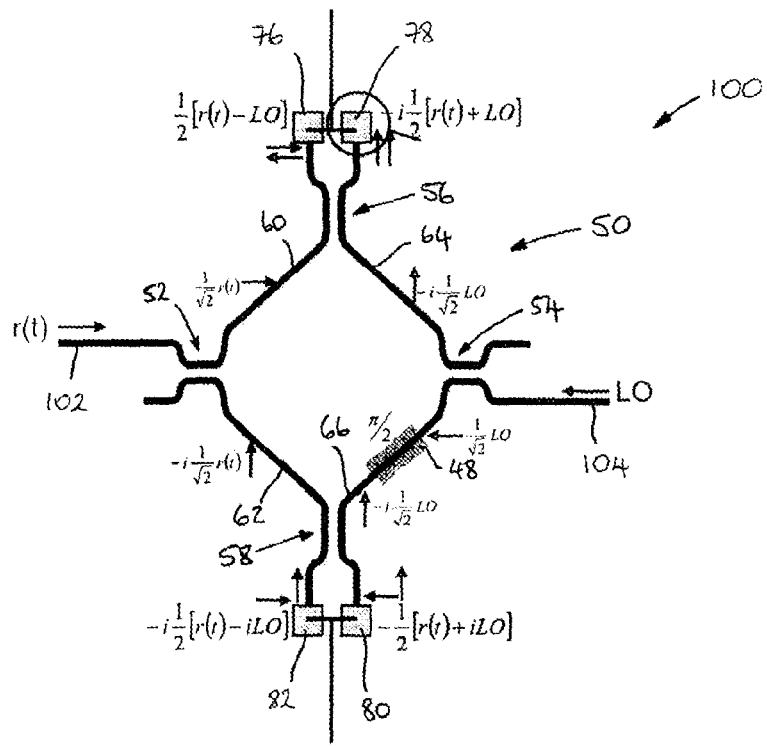
FIG. 6 is a schematic representation of an optical receiver according to a sixth embodiment of the invention.

An optical receiver 100 according to a sixth embodiment of the invention is shown in FIG. 6. The optical receiver 100 comprises a first optical input 102, a second optical input 104, a planar waveguide circuit 50 as shown in FIG. 3 and photodetectors 76, 78, 80, 82.

A first optical input 102 is arranged to receive an optical signal to be detected (r(t)) and the second optical input 104 is arranged to receive a reference optical signal (LO). The photodetectors 76, 78, 80, 82 are coupled to respective outputs of the first and second optical signal combiners 56, 58.

FIG. 6 also includes an indication of how the optical power and phase of the input and reference optical signals are affected on propagation through the planar waveguide circuit 50 and the combinations which are provided at each of the photodetectors 76, 78 80, 82. The input optical signal (r(t)) is 50:50 power split by the first 3 dB coupler 52 to form an in-phase component $$\left(\frac{1}{\sqrt{2}}r(t)\right)$$

and a quadrature-phase component $$\left(-i\frac{1}{\sqrt{2}}r(t)\right).$$

The reference optical signal (LO) is similarly 50:50 power split by the second 3 dB coupler 54 to form an in-phase component $$\left(\frac{1}{\sqrt{2}}LO\right)$$

and a quadrature-phase component $$\left(-i\frac{1}{\sqrt{2}}LO\right).$$

At the first optical signal combiner, 3 dB coupler 56, the in-phase component of the input optical signal is 50:50 power split into an in-phase component $$\left(\frac{1}{\sqrt{2}}r(t)\right)$$

and a quadrature-phase component $$\left(-i\frac{1}{\sqrt{2}}r(t)\right).$$

The quadrature-phase component of the reference signal is also 50:50 power split by the 3 dB coupler 56 into an in-phase component $$\left(-i\frac{1}{\sqrt{2}}LO\right)$$

and a quadrature-phase component $$\left(-\frac{1}{\sqrt{2}}LO\right).$$

The quadrature-phase component of the input optical signal is 50:50 power split at the second optical signal combiner, 3 dB optical coupler 58, into an in-phase component $$\left(-i\frac{1}{\sqrt{2}}r(t)\right)$$

and a quadrature-phase component $$\left(-\frac{1}{\sqrt{2}}r(t)\right).$$

The in-phase component of the reference optical signal has a π/2 phase shift applied to it by the phase-shifter 48 and the resulting phase-shifted in-phase component of the reference optical signal is then 50:50 power split by the second optical signal combiner, 3 dB coupler 58, to form an in-phase component $$\left(-i\frac{1}{\sqrt{2}}LO\right)$$

and a quadrature-phase component $$\left(\frac{1}{\sqrt{2}}LO\right).$$

The in-phase and quadrature-phase components of the input optical signal (r(t)) and the reference optical signal (LO) are mixed at the photodetectors 76, 78, 80, 82 as follows:

First photodetector 76:

$$\frac{1}{\sqrt{2}}r(t) \text{ and } -\frac{1}{\sqrt{2}}LO = \frac{1}{2}[r(t)-LO]$$

Second photodetector 78:

$$-i\frac{1}{\sqrt{2}}r(t) \text{ and } -\frac{1}{\sqrt{2}}LO = -i\frac{1}{2}[r(t)+LO]$$

Third photodetector 80:

$$-\frac{1}{\sqrt{2}}r(t) \text{ and } -i\frac{1}{\sqrt{2}}LO = -\frac{1}{2}[r(t)-iLO]$$

Fourth photodetector 82:

$$-i\frac{1}{\sqrt{2}}r(t) \text{ and } \frac{1}{\sqrt{2}}LO = -i\frac{1}{2}[r(t)-iLO]$$

The planar waveguide circuit 50 therefore mixes the input optical signal with the four in-phase and quadrature-phase states of the reference optical signal to form the four vectorial additions of the reference signal and the input signal typically found within a 90° optical hybrid: r(t))+LO (a+b); r(t))−LO (a−b); r(t))+iLO (a+ib); and r(t))−LO (a−ib).

Figure 7:
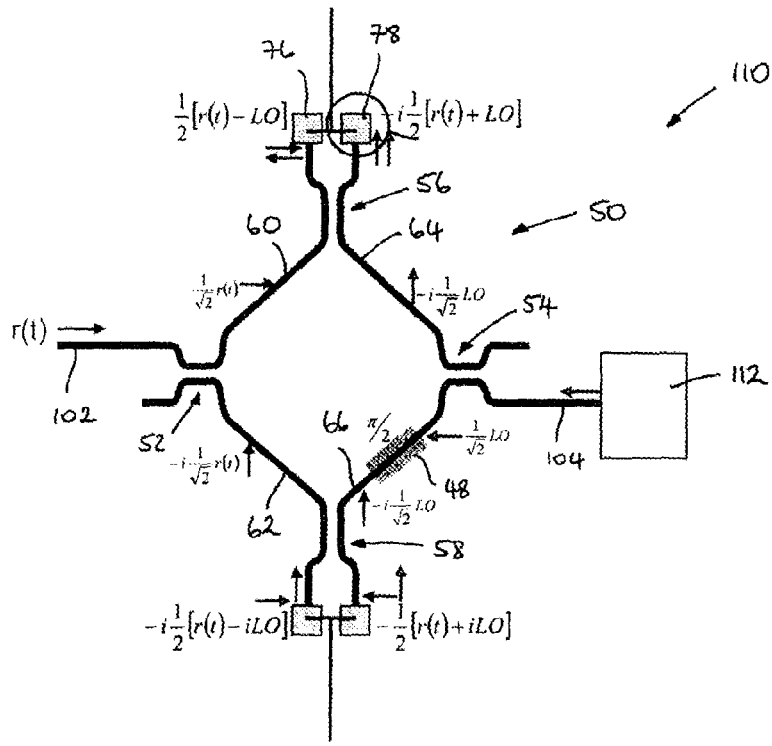
FIG. 7 is a schematic representation of an optical receiver according to a seventh embodiment of the invention.

An optical receiver 110 according to a seventh embodiment of the invention is shown in FIG. 7. The optical receiver 110 of this embodiment is substantially the same as the optical receiver 100 of FIG. 6 and the same reference numbers are retained for corresponding features.

In this embodiment, the optical receiver 110 further comprises an optical source 112 arranged to generate a reference optical signal (LO). The optical source 110 is coupled to the second optical input 104 of the optical receiver 110.

The invention claimed is:

1. A planar waveguide circuit comprising:
   a first optical splitter arranged to receive an input optical signal;
   a second optical splitter arranged to receive a reference optical signal;
   a first optical signal combiner;
   a second optical signal combiner;
   first and second optical waveguides arranged to couple a first output and a second output of the first optical splitter to respective inputs of the first and second optical signal combiners, and third and fourth optical waveguides arranged to couple a first output and a second output of the second optical splitter to respective inputs of the first and second optical signal combiners; and
   a phase-shifter located to affect the phase of an optical signal propagating in one of the third and fourth optical waveguides,
   wherein the first and second optical splitters and the first and second optical signal combiners are arranged such that the first, second, third and fourth optical waveguides do not intersect one another,
   wherein the phase-shifter comprises a resistive heater arranged to affect a portion of said one of the third and fourth optical waveguides to change a refractive index of the portion of said one of the third and fourth optical waveguides.

2. A planar waveguide circuit as claimed in claim 1, wherein the first optical waveguide is arranged to couple the first output of the first optical splitter to a first input of the first optical signal combiner, the second optical waveguide is arranged to couple the second output of the first optical splitter to a first input of the second optical signal combiner, the third optical waveguide is arranged to couple the first output of the second optical splitter to a second input of the second optical signal combiner, and the fourth optical waveguide is arranged to couple the second output of the second optical splitter to a second input of the second optical signal combiner.

3. A planar waveguide circuit as claimed in claim 1, wherein the first and second optical waveguides have substantially equivalent path lengths and the third and fourth optical waveguides have substantially equivalent path lengths.

4. A planar waveguide circuit as claimed in claim 3, wherein all the optical waveguides have substantially equivalent path lengths.

5. A planar waveguide circuit as claimed in claim 1, wherein the first and second optical waveguides have substantially mirror symmetric paths and the third and fourth optical waveguides have substantially minor symmetric paths.

6. A planar waveguide circuit as claimed in claim 5, wherein the first and an adjacent one of the third and fourth optical waveguides have substantially mirror symmetric paths and the second and an adjacent one of the third and fourth optical waveguides have substantially mirror symmetric paths.

7. A planar waveguide circuit as claimed in claim 1, wherein the first and second optical splitters are provided at generally opposing locations within the planar waveguide circuit.

8. A planar waveguide circuit as claimed in claim 7, wherein the first optical signal combiner is provided on one side of the second optical splitter and the second optical signal combiner is provided on the other side of the second optical splitter.

9. A planar waveguide circuit as claimed in claim 7, wherein the first optical signal combiner is provided at a first location within the planar waveguide circuit and the second optical signal combiner is provided at a second location within the planar waveguide circuit, substantially opposite the first location, the first and second locations being spaced from the first and second optical splitters.

10. A planar waveguide circuit as claimed in claim 1, wherein the first and second optical splitters comprise one of a three-port optical waveguide splitter and a four-port optical waveguide coupler.

11. A planar waveguide circuit as claimed in claim 1, wherein the first and second optical signal combiners comprise four-port 3 dB optical couplers.

12. An optical receiver comprising:
   a first optical input arranged to receive an optical signal;
   a second optical input arranged to receive a reference optical signal;
   a planar waveguide; and
   first, second, third and fourth photodetectors coupled to respective outputs of the first and second optical signal combiners,
   wherein the planar waveguide circuit comprises:
   a first optical splitter arranged to receive an input optical signal;

a second optical splitter arranged to receive a reference optical signal;
a first optical signal combiner;
a second optical signal combiner;
first and second optical waveguides arranged to couple a first output and a second output of the first optical splitter to respective inputs of the first and second optical signal combiners, and third and fourth optical waveguides arranged to couple a first output and a second output of the second optical splitter to respective inputs of the first and second optical signal combiners; and
a phase-shifter located to affect the phase of an optical signal propagating in one of the third and fourth optical waveguides,
wherein the first and second optical splitters and the first and second optical signal combiners are arranged such that the first, second, third and fourth optical waveguides do not intersect one another,
wherein the phase-shifter comprises a resistive heater arranged to affect a portion of said one of the third and fourth optical waveguides to change a refractive index of the portion of said one of the third and fourth optical waveguides.

13. The optical receiver of claim 12, comprising turning minors arranged to couple outputs of the first and second optical signal combiners to the respective photodetectors.

* * * * *

UNITED STATES PATENT AND TRADEMARK OFFICE
CERTIFICATE OF CORRECTION

PATENT NO. : 8,861,902 B2
APPLICATION NO. : 13/022200
DATED : October 14, 2014
INVENTOR(S) : Bontempi et al.

It is certified that error appears in the above-identified patent and that said Letters Patent is hereby corrected as shown below:

In the Specification

In Column 6, Line 18, delete "n/2" and insert -- π/2 --, therefor.

In Column 6, Line 38, delete "splitters 56, 58" and insert -- splitters 52, 54 --, therefor.

In Column 9, Line 17-18, delete " $-\frac{1}{2}[r(t) - iLO]$ " and insert -- $-\frac{1}{2}[r(t) + iLO]$ --, therefor.

In Column 9, Line 32-33, delete "r(t))+LO (a+b); r(t))-LO (a-b); r(t))+iLO (a+ib); and r(t))-LO (a-ib)." and insert -- (r(t))+LO (a+b); (r(t))-LO (a-b); (r(t))+iLO (a+ib); and --.

In the Claims

In Column 10, Line 27, in Claim 5, delete "minor" and insert -- mirror --, therefor.

In Column 11, Line 25, in Claim 13, delete "minors" and insert -- mirrors --, therefor.

Signed and Sealed this
Thirtieth Day of June, 2015

Michelle K. Lee
*Director of the United States Patent and Trademark Office*